(12) United States Patent
Hamilton (10) Patent No.: US 10,542,654 B2
(45) Date of Patent: Jan. 28, 2020

(54) SOIL LOOSENING AND FURROWER ASSEMBLIES AND A BED RENOVATOR THEREFOR

(71) Applicant: MAXIMUM SOIL AND WATER PRODUCTIVITY PTY LTD, Leeming, W.A. (AU)

(72) Inventor: Gregory Hamilton, Leeming (AU)

(73) Assignee: MAXIMUM SOIL AND WATER PRODUCTIVITY PTY LTD, Leeming (AU)

( * ) Notice: Subject to any disclaimer, the term of this patent is extended or adjusted under 35 U.S.C. 154(b) by 68 days.

(21) Appl. No.: 15/752,148

(22) PCT Filed: Aug. 12, 2016

(86) PCT No.: PCT/AU2016/050737
§ 371 (c)(1),
(2) Date: Feb. 12, 2018

(87) PCT Pub. No.: WO2017/027907
PCT Pub. Date: Feb. 23, 2017

(65) Prior Publication Data
US 2018/0235136 A1 Aug. 23, 2018

(30) Foreign Application Priority Data
Aug. 14, 2015 (AU) ................................ 2015903268

(51) Int. Cl.
*A01B 49/02* (2006.01)
*A01B 13/08* (2006.01)
(Continued)

(52) U.S. Cl.
CPC ................ *A01B 15/06* (2013.01); *A01B 3/40* (2013.01); *A01B 13/08* (2013.01); *A01B 49/02* (2013.01)

(58) Field of Classification Search
CPC .......... A01B 13/08; A01B 37/00; A01B 49/02
See application file for complete search history.

(56) References Cited

U.S. PATENT DOCUMENTS

| 4,560,010 A | 12/1985 | Weichel |
| 4,955,297 A | 9/1990 | Tsukamoto |
(Continued)

FOREIGN PATENT DOCUMENTS

| CA | 1243882 A | 11/1988 |
| CA | 2265085 A1 | 9/2000 |
(Continued)

OTHER PUBLICATIONS

International Search Report & Written Opinion dated Dec. 12, 2016 from corresponding PCT Application No. PCT/AU2016/050737.
(Continued)

*Primary Examiner* — Tara Mayo-Pinnock
(74) *Attorney, Agent, or Firm* — Innovation Capital Law Group, LLP; Vic Lin (57) ABSTRACT

There is provided soil loosening and furrower assemblies and a bed renovator therefor. The soil loosening assembly comprises a blade assembly and wherein the blade assembly is horizontally pitched such that, when drawn beneath a soil surface at a fixed depth, the horizontally pitched blade assembly severs rootstock at the level of the blade assembly while retaining the rootstock substantially in place and loosens soil above the level of the blade assembly without substantial soil inversion. The furrower assembly comprises side plates extending rearwardly from a forward prow edge, wherein the side plates are approximately 25-45° with respect to the horizontal axis; and bottom edges of the side plates are approximately 20-40° with respect to a direction-of-travel axis.

13 Claims, 4 Drawing Sheets

(51) Int. Cl.
*A01B 15/02* (2006.01)
*A01B 5/06* (2006.01)
*A01B 15/06* (2006.01)
*A01B 3/40* (2006.01)

(56) References Cited

U.S. PATENT DOCUMENTS

| | | | |
|---|---|---|---|
| 5,865,131 A | 2/1999 | Dietrich et al. | |
| 2010/0051300 A1* | 3/2010 | Hall | A01C 5/062 172/297 |
| 2010/0139938 A1* | 6/2010 | Henry | A01C 5/062 172/724 |
| 2010/0326683 A1 | 12/2010 | Kovach et al. | |
| 2011/0010314 A1* | 1/2011 | Tomich | A01B 13/08 705/500 |

FOREIGN PATENT DOCUMENTS

| | | |
|---|---|---|
| CN | 201450761 U | 5/2010 |
| CN | 201528516 U | 7/2010 |
| CN | 202112010 U | 1/2012 |
| CN | 103891430 A | 7/2014 |
| CN | 204119772 U | 1/2015 |
| DE | 2713981 A1 | 10/1978 |
| EP | 0070396 A | 1/1983 |
| EP | 0416374 A2 | 3/1991 |
| EP | 1504639 A1 | 2/2005 |
| GB | 191122374 A | 2/1912 |

OTHER PUBLICATIONS

Extended European Search Report dated Mar. 26, 2019 from related European Application No. 16836264.8.

* cited by examiner

SOIL LOOSENING AND FURROWER ASSEMBLIES AND A BED RENOVATOR THEREFOR

FIELD OF THE INVENTION

The present invention relates to agricultural machinery for the construction and maintenance of permanent or semi-permanent beds and furrows used for growing agricultural crops and pastures under irrigation, or in high rainfall areas where soils are subject to seasonal waterlogging and in particular, but not necessarily entirely, to a soil loosening assembly and furrower assembly, and, in embodiments, bed renovator frame for the soil loosening assembly and furrower assembly.

The machinery disclosed herein is not intended to be a primary tillage implement but may rather be utilised for soil ploughed in preparation for constructing permanent beds or for renovating existing beds that have settled over a cropping season and are being prepared for the seeding the next crop.

Unlike any conventional machinery, the present soil loosening assembly is able to simultaneously loosen the soil across substantially the entire bed width and shape or re-shape the furrows between each bed.

Furthermore, the present soil loosening assembly may loosen the soil within the bed at a depth of about 250 mm, being a depth approximately level with the base of the furrows, while severing the roots of preceding crops without causing substantial inversion or horizontal movement of soil.

In this way the present loosener assembly retains the root system of previous crops in a near-undisturbed state.

Furthermore, the present furrower assembly reforms the furrows to a substantial inverted trapezoidal shape which may have a base width just exceeding the width of the associated tractor and implement tyres. Furthermore, the loose and uncompacted structure of the soil of the furrow walls and the beds provided by the furrow assembly facilitates the lateral infiltration of irrigation water into and the drainage of excess water from the root zone of crops grown on the beds.

The machine can be used immediately prior to seeding, or in combination with a seeder, making bed loosening, furrow re-shaping and seeding a one-pass operation.

BACKGROUND

Soils vary in the stability of their structural porosity in wet conditions. As wet soil disaggregates the soil consolidates to a denser and smaller volume.

At depth, soils are subject to increasing overburden pressure from above due to the weight of soil and the associated water content. Furthermore, the internal friction between soil particles decreases with wetness, reducing resistance to consolidation.

Such processes cause cultivated soils to consolidate over time into denser and less permeable states in which water and air movement and root growth are restricted, reducing shoot growth and grain or forage production. Settled disaggregated soil is ill suited for the germination and growth of plants.

Loose soil, on the other hand, facilitates the growth and proliferation of roots, which increases soil organism populations, both of which stabilise the soil structure and increase crop production. In addition, roots act as reinforcing rods, binding and separating soil particles to withstand the processes of disaggregation and consolidation.

Conventional cultivation inverts soil and tears out root systems exposing the roots, organic matter and soil organisms to desiccation and irradiation by ultra-violet light. As a consequence, cultivated soils have less roots, organic matter and soil organisms and are therefore less stable when wet. As such, conventionally cultivated soils rapidly disaggregate and consolidate to densities that constrain plant growth and development.

The advent of selective herbicides and no-tillage seeders has allowed for the reduced cultivation of narrow strips of soil in which seed and fertiliser are placed. Whilst this practice has generally led to increases in organic matter and stability of the surface layer of soil, it does not prevent settlement and consolidation of soil between the sown rows and below about 80 mm depth.

Furthermore, irrigated soils are particularly prone to consolidation due to frequent applications of large amounts of water that wet the soil close to saturation point. Similarly, soils in high rainfall areas may experience saturation and consolidation when rainfall exceeds evaporation and drainage.

Current best practice and technology recommends farmers irrigating or growing rainfed no-tillage crops on soils with consolidated root zones below about 80 mm. These consolidated root zones limit drainage of waterlogged soils and slow infiltration on irrigated soils. In consequence, irrigation applications need to be prolonged to allow time for water to penetrate to the centre of beds to ensure even crop growth.

In both sets of circumstance however, production is constrained, and in the case of irrigation, prolonged application times lead to considerable amounts of water being 'lost' to drainage beyond the root zone of crops. In fact, industry standards for irrigation accept that 150 mm of water is lost to deep drainage each cropping season, being equivalent to 1.5 mega litres/hectare. With water in the Murray-Darling Basin of Australia costing $1,500 to $3,000 a megalitre of water, this equates to a cost of $2,250 to $4,500 per hectare per crop.

SUMMARY OF THE PRESENT SOIL LOOSENING ASSEMBLY AND A DESCRIPTION OF THE RELATED ART

The objectives of the design of the present soil loosening blades were to achieve a soil management research objective of creating a deeper, structurally stable and biologically more fertile seedbed for crops and pastures.

Utilising my skills across agronomy, soil biology, soil physics, soil management, soil mechanics and engineering, I found that the essence of achieving this objective was to loosen soil without inversion to a depth of approximately 250 mm. Also, it was found that the apparatus required for such loosening should require relatively little power to operate across a width of at least 8 metres and could be adapted for machinery to simultaneously seed crops with a single pass operation.

This research found that an apparatus required to meet these objectives ideally needed to have few tines/shanks across the operational width to reduce the power requirement and have a soil loosening apparatus with a wide span per supporting shank to create a laterally uniform seedbed/rooting zone with a small number of shanks.

It was further found that such soil loosening apparatus should have zero or very little upward slope from the front to back of the soil loosening apparatus to minimise soil disturbance which could expose and desiccate soil organisms and roots.

It was further found that such soil loosening apparatus ideally should have blades being relatively thin to minimise power requirements and soil disturbance.

It was further found that such blades should ideally have broad length along the direction of travel to minimise downward pressure on the soil beneath the blade and so avoid or reduce the creation a ploughpan, being smeared and compacted soil beneath the depth of operation.

It was further found that such blades should have an approximate 30° leading edge angle of incidence (measured from the rear centreline of travel) to minimise the forces of adhesion and friction between the soil and steel; and maximise root cutting effectiveness and efficiency.

Now, no prior art machinery has the attributes to meet the above objectives.

DE 2713981 A1 (BLANK KARL), (hereafter "D1") discloses a Tiefenlockerer ("subsoiler") being a vibrating ripper intended for use in loosening compact soil at depth. From the drawings, of D1 has a horizontal foot that is approximately square, appearing to be ~150 mm square. The leading edge of the horizontal foot is knife-shaped that is bevelled top and bottom and is aligned at right angles to the direction of travel. The lateral extremities of the foot of D1 comprise cylindrical rails. This shape and the short, flat base of the blade will cause considerable downward pressure and create a compact ploughpan beneath its operational depth.

U.S. Pat. No. 5,865,131 A (DIETRICH, S R ET AL), (hereafter "D2") discloses a slurry fertilizer applicator having a spring-cushioned coulter running ahead of the applicator for cutting an initial slot in any residue and for providing a break line for the soil to be parted by the trailing shank. The trailing shank, in turn, spreads the initial slot, and deepens it, for the entry of a slurry delivery tube welded behind the shank. At the bottom of the shank is a shoe having a pair of side wings. A downward and outward slope of the wings creates a peaked shape on the soil ("sole") beneath the wings having sides which slope downwardly and outwardly, conforming to the shape of the wings. The lift surfaces of the wings substantially raise the soil upwardly and outwardly away from the shank toward the ends of the wings to provide slots or fissures above the peak-shaped sole, permitting, and promoting the lateral distribution of the slurry.

CA 1243882 A (STROHM), (hereafter "D3") discloses a subsoil tillage machine with a configured soil lifting action that lifts and fractures the soil the width of the tillage machine. This machine has shanks spaced at about 450 mm each with small wings of about 150 mm side-to-side width near their base. Specifically, D3 comprises wings with an upward front-to-back slope of about 10° relative to a line parallel to the soil surface. When the tillage machine is pulled through the soil, the close-spaced shanks and upward-angled wings lift and fracture the soil the across the width of the machine, breaking up any hard pan and causing considerable disturbance to the surface soil.

Now, none of these references have been manufactured for the same or similar purposes of the present machinery disclosed herein and therefore their designs and operation cannot achieve the results of the present machinery disclosed herein.

Specifically, and as will become apparent from the ensuing detailed description, a first design difference is that the present soil loosening assembly comprises horizontally pitched blades which substantially eliminate soil inversion when drawn beneath the surface of the soil, whereas the vibrating action of the foot of D1 disturbs the soil and inadvertently compacts the soil beneath each foot.

Furthermore, the blades of D2 and D3 are pitched so as to specifically disturb or invert the soil. Specifically D2 (noted as being rather disclosed for the purpose of fertiliser application) discloses wings having lifting services to raise and part the soil laterally for the purposes of allowing the lateral distribution of the slurry/fertiliser. D3 has upwardly sloped wings configured for lifting and fracturing the soil so as to break up hard pan. As such, D1-D3 are not concerned with reducing soil disturbance and inversion.

A second design difference is that the foot of D1 and the blades of D2-D3 have short outward lengths that appear to span less than 300 mm (150 mm either side of their centreline). In consequence, the D1-D3 are not concerned with uniform working of the soil across the entire width of the machines on which the implements are mounted, wherein, even if they were mounted to span the entire width, the narrow spans of the foot and blades of D1-D3 would require more tines per width of operation, increasing the soil disturbance and traction power required.

The foot of D1 and the blades of D2-D3 all cause compaction to the soil immediately below the depth of operation on account of the downward acting forces on the leading edges, the front-to-back slant/orientation and the narrow front-to-back width of the blades, over which the downward forces are spread.

As is clear, the purpose, design and operation of the present soil loosening assembly differ entirely from the purposes, designs and operation of the cited references D1-D3 and therefore cannot be said to anticipate the present soil loosening assembly. Furthermore, there is no evidence that the skilled addressee would have even recognised the problems or objectives addressed by the present soil loosening assembly and, even if the skilled addressee had for arguments sake, it could furthermore not be reasonably argued that the skilled addressee would have sought out D1-D3, let alone combine them.

In summary, none of the prior art discloses or suggests a soil loosening assembly of the present invention comprising horizontally pitched mounted blades that can sever plant roots at about 250 mm depth while gently loosening the soil and preserving the mass and structure of root systems of previous crops. Further specifically, none of the prior art discloses or suggests blades of specific embodiments disclosed herein that are thin, have a single upward bevel on its leading edge; have a deep front-to-back width to minimise downward pressures and avoid under-side soil compaction; have a blade that has a leading edge with a horizontal angle of incidence at approximately 30° (measured from the rear centreline of travel) that reduces steel-to-soil friction and adhesion forces; or that have wide wing span requiring two mounting shanks for two soil loosener assemblies to loosen the entire width of soil between tractor tyres.

SUMMARY OF THE PRESENT FURROWER ASSEMBLY AND A DESCRIPTION OF THE RELATED PRIOR ART

The design of the presently disclosed furrower assembly was based on functionality suited for the desired purposes and objectives and efficiency of operation.

Specifically, the design of the present furrower assembly was based on a discovered soil management objective to create furrows with a base that is substantially flat and wider than the width of tractor and implement tyres that will pass along it. Such a width avoids tyres pressing against the furrow walls and compacting and smearing the soil, particularly in the bottom half of the walls, through which irrigation water must be absorbed for use by plants growing on the beds or ridges between the furrows.

Furthermore, the design of the present furrower assembly was further based on a discovered soil management objective to lift and spread without inverting the soil that is excavated from the furrow and thereby minimise compaction of the sidewalls and exposure and breakdown of soil organisms and organic residues. An embodiment of the present furrower having side plates having a vertical backward 45° angle and a horizontal 30° sideways angle was found to substantially meet this objective.

It was further found that embodiment of the present furrower having steep angled rear edge of each side plate creating a steep furrow wall of about 100° from the furrow base outwards maximised the crop bed area between furrows.

Further, a discovered mechanical objective was to maximise the cutting/digging efficiency of the furrower, embodied in an embodiment of the present furrower having a leading prow edge of not being substantially vertical and being approximately 45° from the horizontal.

A further discovered mechanical objective was minimising the adhesion and friction forces of soil sliding upwards and outwards, embodied in an embodiment of the present furrower having side plates having an approximate 30° sideways angle from the rear centreline of the direction of travel.

A further discovered mechanical objective was to accommodate the need for varying the base width of furrows, embodied in an embodiment of the present furrower having the ability to mount differing length side plates at the above vertical and horizontal angles of incidence of 45° and 30°, respectively.

As such, none of the objectives of the present furrower were recognised by the prior art. Neither were the specific features and functionality of the present furrower assembly disclosed or suggested by the prior art.

CN 201450761 U, (hereafter "D4") discloses a plough opener for use in dryland farming that can be connected to a tractor wherein the ditch width can be controlled by an adjustable expansion shield.

CN 103891430 A, (hereafter "D5") discloses a two-way plough wherein the angle formed between the left plough wall and the right plough wall can be adjusted through the adjusting plate, and therefore large or small furrows can be formed. Also, the height of the plough column can be adjusted, and therefore the depth of the formed furrows can be controlled.

U.S. Pat. No. 4,955,297 A, (hereafter "D6") discloses a seeding planter shoe for agricultural planters for drawing through agricultural soil, substantially with restricted compression of the adjacent soil remaining in place and defining the furrow laterally, which shoe has a prow sloping upwardly and backwardly from a forward soil-penetrating point at and depending below the bottom of the shoe proper, which is substantially planar, and side walls that diverge backwardly and upwardly, from a prow piece to which they are rigidly joined, for from about one-half to about three-quarters the length of the shoe and continuing on longitudinally of the shoe substantially in parallel for the remainder of the length of the shoe. The prow piece slopes backwardly at an angle of about 45° to about 50°, and preferably 47°, to the planar bottom of the shoe.

Now, as will further become apparent from the ensuing description, none of references D3-D5 has been designed or manufactured for the same purposes as those of the present furrower assembly, and therefore their operation cannot achieve the results of the present furrower.

Specifically, a first design difference is that the leading edge of the furrower of D4 is substantially vertical and the horizontal angle of the leading edge of the implement in reference D5 is approximately 65° from the rear centreline of the direction of travel.

As will become apparent from the ensuing description, the implements of D4-D6 have leading edges that are too steep for efficient cutting and will cause excessive disturbance of the soil as it tumbles and slides along the side plates.

Furthermore, a second design difference is that the side plates of the furrowers of D4-D6 are substantially vertical unlike the backwards tilted side plates of the present furrower which lift soil. As such, the result of the apparatus of D4-D6 is that soil is pushed laterally aside at substantial right angles to the direction of travel resulting in the soil being compacted into the walls of the soil between furrowers.

Furthermore, the shape of the furrows produced by the furrower of D5 is substantially triangular wherein the walls are sloped at approximately 50° from the horizontal. This shape results in the compaction of the lower sides of the furrows by the tyres of tractors and implements passing through the furrows. Furthermore, D5 produces beds having narrow top widths.

In contradistinction, the particular configurations of the present furrow have been shown through trial and experiment to provide significant advantages in light of existing furrow assemblies.

Specifically, the present blade looseners with and without furrowers have been tested in large-scale farm experiments, on a range of soil types, under both rainfed and irrigation regimes in south west Western Australia, Pakistan and on the Darling Downs of southern Queensland. The key findings of this research have been that root growth (mass and proliferation) in the top 30 cm of soil increased by 15-20 percent per cropping season, with most of this increase occurring in the 10-30 cm depth interval.

Furthermore, soil organic carbon and total nitrogen contents increased by greater than 30 percent over a six-year period.

Furthermore, crop production increases of 15 to 50 percent occurred every cropping season in barley, wheat, oats, canola, peas and maize crops.

Furthermore, waterlogging was substantially prevented, and crop lodging (falling over in wet conditions) was substantially eliminated.

Furthermore, irrigation applications on both dry and moist soils were reduced in time and amount by 30 to 50 percent.

Furthermore, the draft (power) requirements of the present implement were negligible according to field operators, who also assessed as possible the combination of the present furrower and a seeder to achieve bed loosening, furrow cleaning and re-shaping plus seeding with a single operation.

It should be specifically noted that none of the foregoing description in relation to the prior art and the objectives and advantages should be construed as a being a promise, guarantee or warranty relating to the features, functionality and advantages of the claimed invention and that it should be specifically noted that not every claim may necessarily achieve each and every advantage for objectives alluded to herein.

SUMMARY OF THE DISCLOSURE

As such, with the foregoing in mind, there is provided a soil loosening assembly, comprising a blade assembly and wherein: the blade assembly is horizontally pitched such that, when drawn beneath a soil surface at a fixed depth, the horizontally pitched blade assembly: severs rootstock at the level of the blade assembly while retaining the rootstock substantially in place; and loosens soil above the level of the blade assembly without causing soil inversion.

The fixed depth may be less than 250 mm.

The blade assembly may comprise laterally extending horizontal blades.

Laterally extending horizontal blades are symmetric about a direction-of-travel axis.

The blades may have swept-wing profiles.

Each blade may be trapezoid.

Each blade may define a leading edge approximately 30° from the rear centreline of the direction of travel.

Each blade may comprise a rearward span of approximately 350 mm.

Each blade may define an inner edge aligned with a direction-of-travel axis and being approximately 350 mm.

Each blade may define an outer edge aligned with a direction-of-travel axis being approximately 100 mm.

Each blade may have a length along a direction-of-travel axis being approximately 640 mm.

Each blade may be trapezoid defining a leading edge and an outer edge and wherein the outer edge may be aligned with a direction-of-travel axis and wherein the outer edge may have a length of approximately 100 mm and wherein the leading edge may have a length along the direction-of-travel axis of approximately 540 mm.

Each blade may be trapezoid defining an inner edge and a trailing edge and wherein the inner edge may be aligned with a direction-of-travel axis and wherein the inner edge may have a length of approximately 350 mm and wherein the trailing edge may have a length along the direction of travel axis of approximately 300 mm.

The blades may have thickness of substantially 10 mm.

A leading edge of each blade may be bevelled with a single straight-edged bevel from a lower side of the blade.

The bevel may be approximately 45° with respect to the lower side of the blade.

Each blade may comprise at least one inner perpendicular mounting plate.

The at least one inner perpendicular mounting plate may be configured for fastening to an opposite mounting plate of an adjacently mounted blade.

The at least one inner perpendicular mounting plate may be configured for fastening to a shank.

The soil loosening assembly may further comprise a shank and further comprising a clamp for clamping the shank to a horizontal frame member.

The clamp may be releasable to transition the clamp laterally along the horizontal frame member.

The soil loosening assembly may further comprise a shank height adjustment mechanism.

The shank height adjustment mechanism may comprise a pair of vertically orientated plates engaging the shank therebetween and wherein an edge of the shank may comprise height adjustment notches configured for engaging bolts passing through the vertically orientated plates.

The height adjustment notches are located at a forward edge of the shank.

The soil loosening assembly may further comprise a ground penetrating point located forward of the blades.

In accordance with a further aspect, there is provided furrower assembly comprising side plates extending rearwardly from a forward prow edge, wherein the side plates are approximately 25-45° with respect to the horizontal axis; and bottom edges of the side plates are approximately 20-40° with respect to a direction-of-travel axis.

The side plates may be tilted backwards at approximately 45° with respect to the horizontal.

The side plates may be angled at approximately 30° from the rear centreline of the direction of travel.

The prow edge may be less than approximately 145° with respect to a vertical axis.

The prow edge may be approximately 135° with respect to the vertical upper portion of the shank.

The trailing edges of the side plates may be configured to form furrow walls being steeper than approximately 80° from the horizontal base of the bed (or 100° from the base of the furrow outwards).

The trailing edges of the side plates may be configured to form furrow walls being approximately 100° from the horizontal base of the furrow.

The furrower may be configured to form a furrow having a flat base.

The flat base may be greater than 300 mm in width.

The flat base may be greater than 450 mm in width.

The furrower assembly may further comprise a shank.

The width of the shank along a direction-of-travel axis may be approximately 100 mm.

The width of the shank widens to approximately 150 mm at approximately 400 mm above a lower end of the shank.

The shank angles forwards at approximately 135° from the vertical at approximately 355 mm above a lower end of the shank.

The furrower assembly may further comprise vertical transitions at top edges of the side plates.

The furrower assembly may further comprise a clamp for clamping the shank to a horizontal frame member.

The clamp may be releasable to transition the clamp laterally along the horizontal frame member.

The furrower assembly may further comprise a shank height adjustment mechanism.

The shank height adjustment mechanism may comprise a pair of vertically orientated plates engaging the shank therebetween and wherein an edge of the shank may comprise height adjustment notches configured for engaging bolts passing through the vertically orientated plates.

The height adjustment notches may be located at a rearward edge of the shank.

In accordance with a yet further embodiment, there is provided a bed renovator comprising at least one soil loosening assembly as described herein and at least one furrower assembly as described herein.

The frame may comprise hitches for three-point linkage on a tractor, having a top hitch centrally located on a top strut of a sub-frame mounted to the frame, and wherein the top strut may be supported by side struts.

The at least one soil loosening assembly may be located in front of the at least one furrower assembly along a direction of travel.

The frame may comprise at least one laterally extending mid-bar located between front and rear lateral bars of the frame and wherein the at least one soil loosening assembly may be mounted to the mid-bar.

The frame may comprise at least one cross-brace between the mid-bar and at least one of the front and rear bars of the frame.

The at least one soil loosener assembly may be at least two soil loosener assemblies and wherein the at least two soil loosener assemblies are laterally located adjacent at least one of the at least one furrower assembly.

The frame may comprise a rear bar and wherein the at least one furrower assembly may be mounted to the rear bar.

The at least one soil loosening assembly may be four soil loosening assemblies and wherein the least one furrower assembly may be two furrower assemblies.

The four soil loosening assemblies may comprise an adjacent to central soil loosening assemblies and two lateral soil loosening assemblies and wherein the two furrower assemblies are located between the lateral soil loosening assemblies and the central soil loosening assemblies.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIGS. 1 to 3 show a bed renovator suited for engaging the soil loosening assembly and furrower assembly disclosed herein in accordance with an embodiment of the present disclosure wherein

FIGS. 4 and 5 show the soil loosening assembly and attachment of such to a shank clamped to the frame of the bed renovator wherein, specifically.

DESCRIPTION OF EMBODIMENTS

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the soil loosening assembly, furrower assembly and bed renovator are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

Bed Renovator

Figure 1:
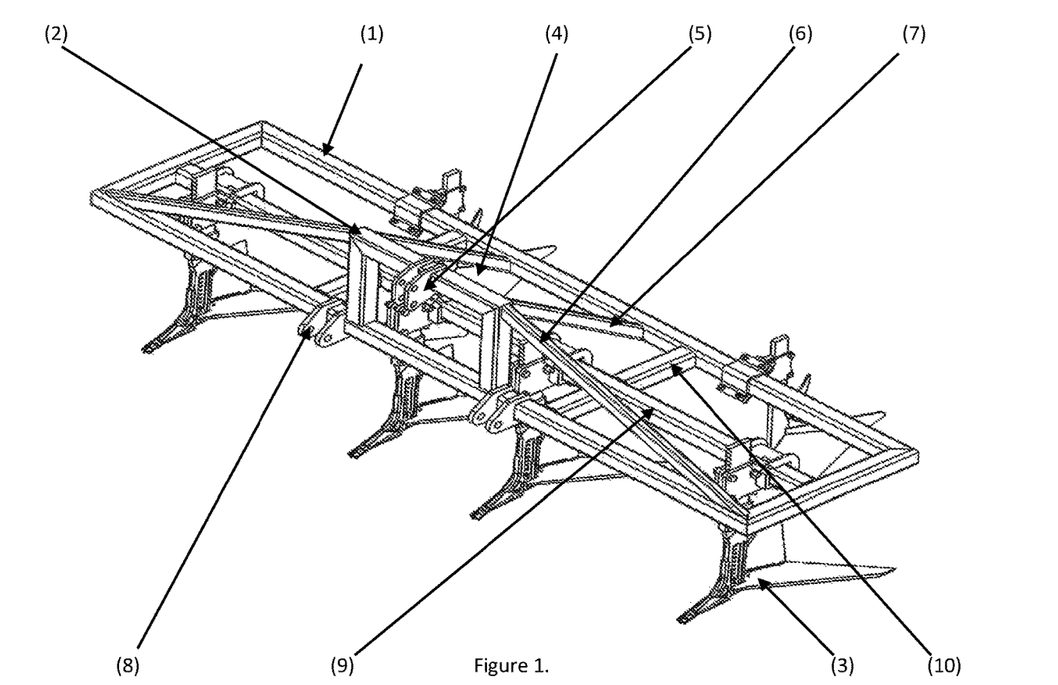
FIG. 1 is an oblique three-dimensional view of the bed renovator engaging the soil loosening assemblies and furrower assemblies and the three-point linkage framework and hitches.
Figure 3:
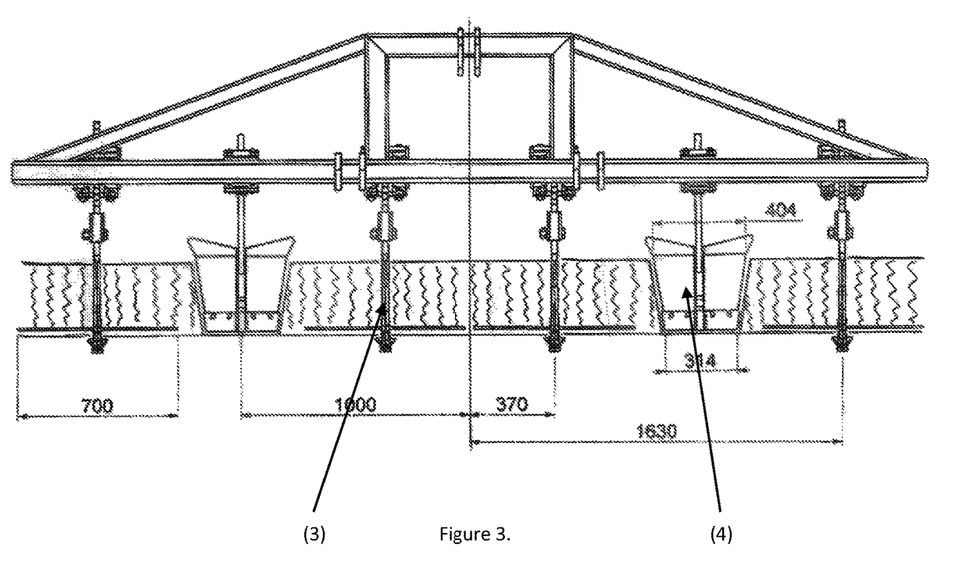

FIGS. 1 and 3 show a bed renovator frame (1) of tubular steel with a vertical sub-frame (2) on top of the front lateral of the rectangular frame for attaching the bed renovator to the three-point linkage mechanism on the rear of tractors.

The embodiment shown in these drawings shows a frame on which are mounted four soil loosening assemblies (3) and two furrowing assemblies (4).

Whereas the embodiment shown may be utilised for one-and-two-half beds application, a person skilled in the art would realise that such a frame and componentry could vary in width and the number of components. For instance, depending on farmer choice or the size of fields and machinery, bed renovators can be one-bed, one and two half beds, three-beds, and three-and-two-half beds wide, or any other mechanically feasible width.

In the embodiment shown, the bed renovator frame (1) is rectangular with the larger axis at right angles to the direction of travel.

The centrally located vertical sub-frame (2) has a bracket on a top bar (5) that hitches to the top arm of a three-point linkage mechanism at the rear of a tractor. This frame (2) is supported laterally by tubular steel struts (6) that run diagonally from its two top corners to the topside of the front bar of the rectangular frame. Similar diagonal struts extend from both top corners of the sub-frame to the rear lateral (7) of the rectangular frame as is best seen in FIG. 1. The two hitches for the two lower arms of a tractor's three-point linkage mechanism (8) are located on the front side of the main frame aligned immediately adjacent to the verticals of the vertical sub-frame.

Figure 2:
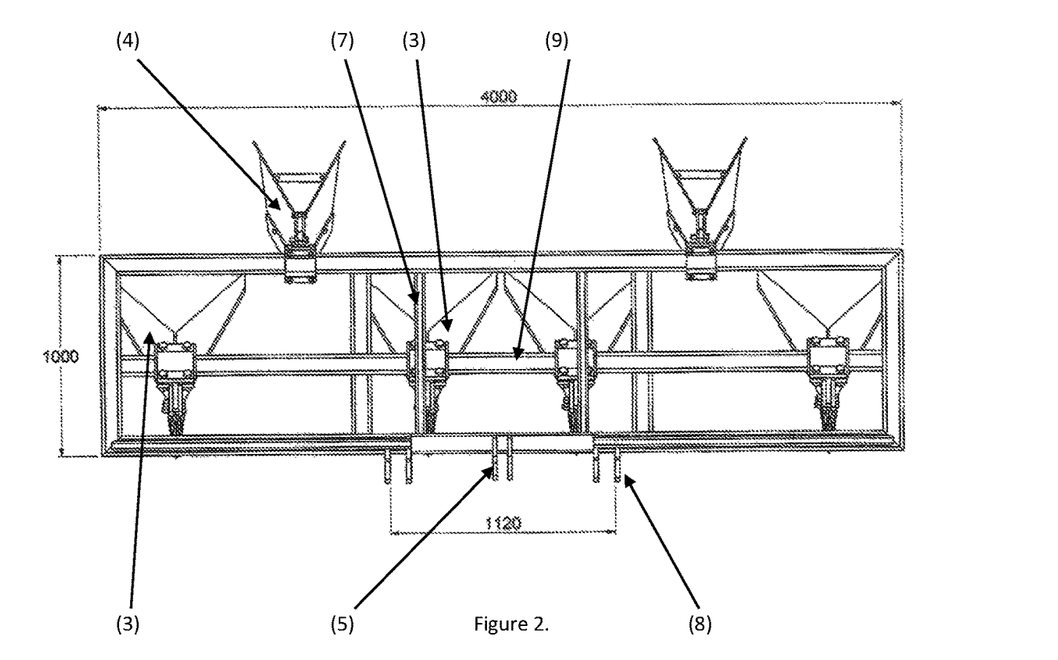
FIG. 2 is a plan view of the bed renovator showing the soil loosening assemblies in front of and between and furrower assemblies and FIG. 3 is a front-on view of the bed renovator, showing the positioning, depth of operation and span of the soil loosening assemblies relative to the furrower assemblies showing also how the blade looseners cut the roots of crops and loosen the full width of soil between the furrowers.

A lateral cross-member (9) is located internally within the rectangular frame across the full width of the rectangular frame. The lateral cross-member provides a bar on which the blade loosener assemblies (1) are mounted as is best shown in FIG. 2. This internal bar may be strengthened by two cross-braces (10) extending either side to the front and back members of the rectangular frame.

The location of the lateral cross member within the main frame may be determined by the requirement that the outer, trailing edge of the swept-wing shaped blade looseners precede the leading edge of the shank on which the furrow assemblies (4) are mounted as is best shown in FIG. 2. The location of the internal front-to-back cross bracing is related to the size of the machine and can be altered by persons skilled in the art to provide the necessary strengthening, provided the cross bracing does not interfere with the correct positioning of either the blade loosener assemblies (3) and the furrower assemblies (4) mounted on the rear member of the rectangular bar.

The furrower assemblies (4) may be mounted on the rear member of the rectangular frame (1). The furrower assemblies (4) may be positioned on the bar to coincide with the tyre track of the tractor to which the bed renovator is attached, and as the bar is widened, persons skilled in the art will locate them evenly in multiples of the trackwidth of the tractor.

Soil Loosening Assembly

Figure 4:
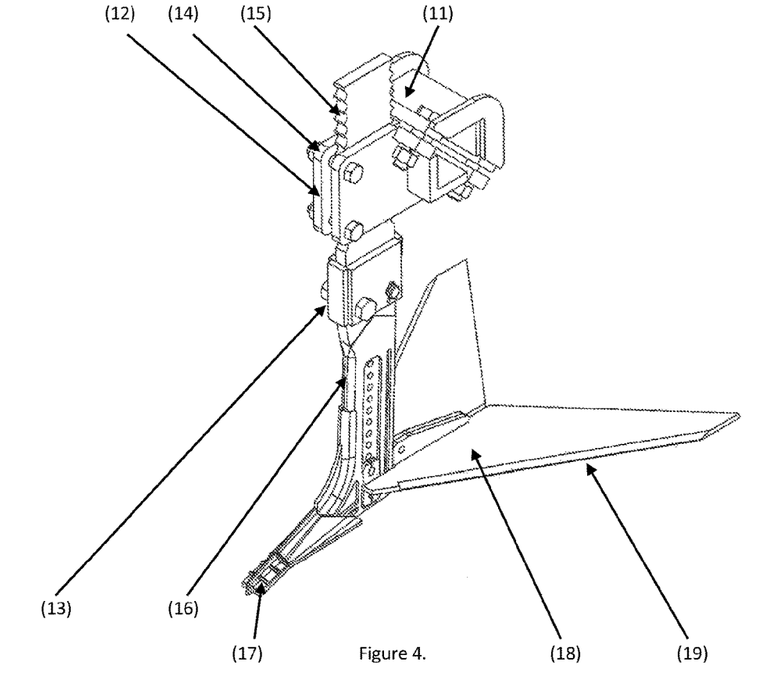
FIG. 4 is an oblique view of the soil loosening assembly, the mounting shanks and the adjustable mounting bracket that clamps the shank on to the bed renovator frame.

The soil loosening assembly (3) in FIG. 4 shows a clamp (11) for mounting and positioning the blade loosening assembly on the central cross member of the bed renovator (1). Welded on to the front side of this clamp (11) are two vertical plates (12) positioned just wide enough to snugly accommodate the shank (13) on which the blade assembly is mounted. These plates have two matching bolt holes (14) close to their upper and lower front corners.

The shank (13) on which the blades are mounted has notches (15) machined into the leading edge (16) that are large enough to accommodate one half the width of bolts that pass through the vertical plates on the bracket that clamps onto the central cross member of the bed renovator. These notches allow the shank (13) to be moved up or down.

The shank (13) is about 20 mm thick by about 100 mm deep. The leading edge (16) of the shank (13) below the height adjustment notches is bevelled on both sides of the centreline at about 45° so as to provide a tapered leading edge that reduces the compressive forces and soil disturbance as it moves through the soil. Wear may be further minimised on this leading edge by clipping a hardened steel shin guard over this tapered edge.

At the base of the shank (13) there may be a soil engaging point (17) that facilitates the downward penetration of the shank and blades to ensure that the blades operate at the desired depth setting.

The soil engaging point (17) may have a chisel-shaped point and may have a leading edge that is below the base of the swept wing blades as is best shown in FIG. 3.

Figure 5A:
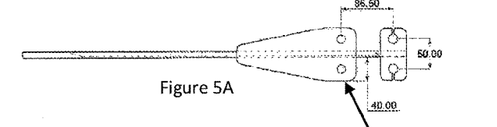
FIG. 5 is a set of three drawings showing (i) an oblique view of the blades of the soil loosening assembly inner vertical plates used to clamp the blades onto the shank with bolts through the centre of the shank and to the adjacent blade behind the shank; and (ii) a plan view of the swept-wing shape of the blades; and (iii) a cross section view of the horizontal alignment and shank mounting plate.
Figure 5B:
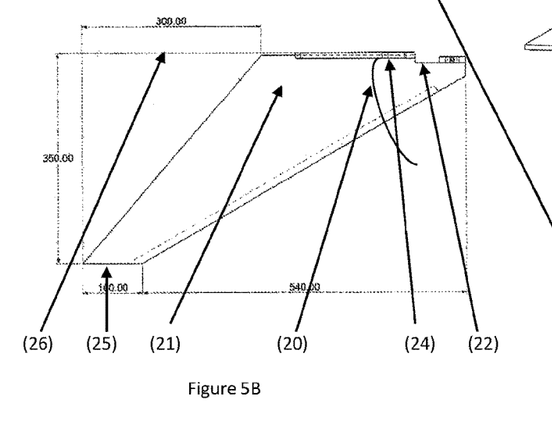
Figure 5C:
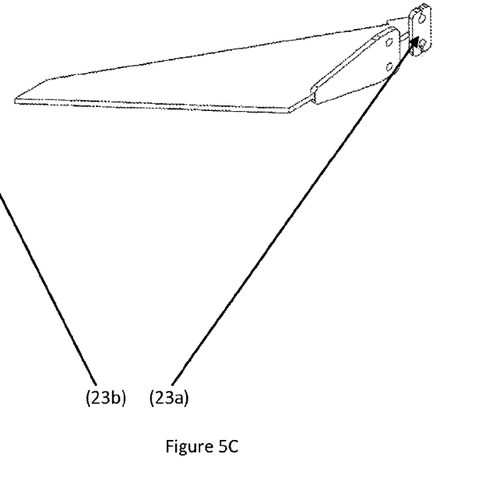

Now, turning now to FIG. 5, the soil loosening assembly (3) may comprise blades (18) which, in the preferred embodiment shown, have a swept-wing profile.

The blades (18) are mounted and operated horizontally. The shape of the blades (18), thinness, single bevelled leading edge (19), angle of incidence of the leading edge with soil (20), and the front-to-back depth (21) were purposely chosen to minimise draft forces; minimise compaction and smearing forces on underlying soil; minimise disturbance of soil above the wing; and maximise the efficiency of cutting roots.

The mounting edge (22) of each blade (18) is shaped to complement the profile of the shank (13) as is best shown in FIG. 5. In this regard, the blades (18) may comprise vertical mounting plates (23) welded on the inner edge (22). In the embodiment shown in FIG. 5, the mounting plates (23) may comprise forward and rearward mounting plates (23a,b).

For the forward mounting plates (23a), bolts can pass through the forward mounting plates through the shank (13). The rearward mounting plates (23b) may be fastened together to hold the blades (18) together as is best shown in FIG. 4.

As can be seen from FIG. 4, the soil loosening assembly (3) may comprise a height adjustment mechanism comprising a railing within which the forward mounting plate (23a) is able to slide vertically and locked in place by a through hole fastener.

In embodiments, the mounting plates (23) are symmetrical and mirrored above and below the blades.

The portions of the mounting plates below the blades (18) may be protected from wear by the soil engaging point (17) of the shank (13) protruding below the lower edge of the mounting plates (23).

As can be best seen from FIG. 4, the soil loosening assembly (3) may comprise a ground penetrating point (17) located forward of the blade assembly.

Exemplary dimensions are given in FIG. 5 wherein, as can be seen, each blade (18) is trapezoid.

Furthermore each blade (18) may define a leading edge (19) angled at approximately 30° from the rear centreline of the direction-of-travel axis. Each blade (18) may comprise a rearward span of approximately 340 mm.

Each blade (18) defines an inner edge (24) aligned with a direction-of-travel axis and being approximately 340 mm.

Each blade (18) may define an outer edge (25) aligned with a direction-of-travel axis and being approximately 100 mm.

Furthermore, each blade (18) may have a length along a direction of travel axis of approximately 640 mm. Specifically, each blade (18) is trapezoid defining the leading edge and the outer edge (25). The outer edge (25) may have a length of approximately 100 mm and the leading edge may have a length along the direction of travel axis of approximately 540 mm.

Furthermore, inner edge (25) may have a length of approximately 340 mm and the trailing edge (26) may have a length along the direction of travel axis of approximately 300 mm.

Each blade (18) may have a thickness of substantially 10 mm.

Furthermore, the leading edge (19) may be bevelled with a single straightedge bevel progressing rearwardly from the lower side of the blade (18). In embodiment, the bevel may be approximately 45° with respect to the lower side of the blade (18).

Furrower Assemblies

Figure 6A:
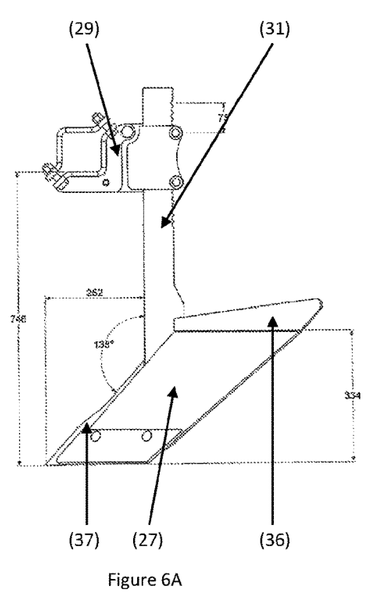
FIG. 6 shows the furrower assembly comprising a depth adjustable shank and frame clamp wherein, specifically, the drawing on the right side is an oblique three-dimensional view of the furrower showing the depth adjustable shank and the clamp that holds the shank and furrower on the frame of the bed renovator, the central drawing shows a front-on view of the furrower showing its flat base and the angle of the rear edge of the furrower side plates that shape the steep walls of the furrow and the left drawing shows a side view of the furrowing assembly illustrating the backward tilt of the sideplates and their wear plates and overflow plates.
Figure 6B:
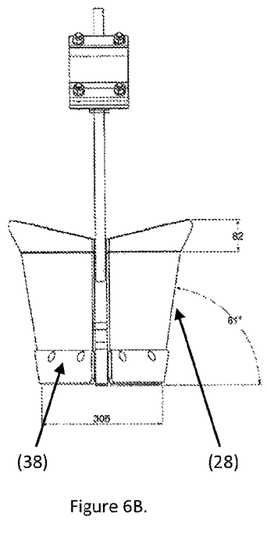
Figure 6C:
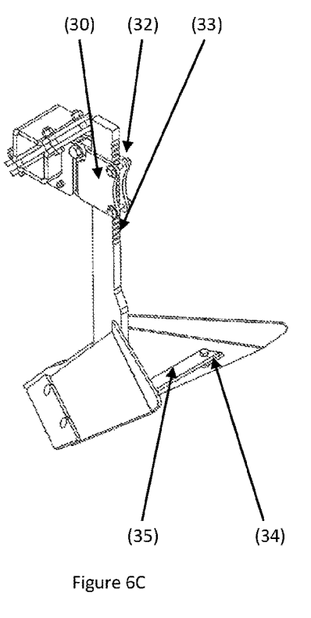

Turning now to FIG. 6, there is shown the furrower assemblies (4) in further detail.

Now, and further with reference to FIG. 3, as can be seen, the furrower assemblies (4) may excavate a furrow having a flat base.

Furthermore, the furrower assemblies (4) may comprise side plates (27) wherein the side plates are long enough such that the base of the furrow is generally wider than the tyres of the tractors and other trailers that pass along the furrows so as to reduce the compaction of the lower walls of the furrows/beds. As can be seen from FIG. 3, the base of the furrow may be approximately 300 mm across.

Now, in a preferred embodiment, the side plates (27) are angled backwards at approximately 45° to the horizontal.

Furthermore, each side plate (27) is angled outwardly from the rear centreline of travel by approximately 30°.

As alluded to above, such a configuration reduces frictional forces when moving soil across the steel plates Furthermore, such a combination displaces the soil outwardly and also substantially upwardly while reducing both soil inversion and lateral compaction of the furrow walls.

Furthermore, side plates (27) may define a trailing edge (28) angled at approximately 100° from the horizontal when viewed from the front of the furrower assembly (4) forming furrows having steep side walls.

Furthermore, the trailing edge transition (28) angled at approximately 100° outwards from the base of the furrow) has been found to shear (rather than smear) the soil in the furrow walls, leaving it open, to facilitate lateral infiltration of water to, or drainage of water from, the beds so created.

As is best shown in FIG. 6, the furrower assemblies (4) may be mounted on the rear member of the bed renovator frame (1) by way of a clamp (29) that clamps around the bar.

The rear side of clamp (29) has two vertical plates (30) welded far enough apart to snugly accommodate the shank (31) on which the furrower is mounted. These plates (30) have bolts (32) in holes near the top and bottom that are one-half accommodated by a series of circular notches (33) machined into the rear edge of the furrower shank (31). The depth setting of the furrowers is adjusted by changing the position of the shank (31) relative to these bolts (32).

The furrower shank (31) may be approximately 20 mm thick. The notches (33) may begin at about 50 mm below the top end of the shank (31) for a distance of about 360 mm. The top section of the shank (31) may be about 500 mm long and 100 mm wide, front to back. Below 500 mm the rear side of the shank (31) may flare out another 50 mm, and at about 750 mm from the top of the shank (31), the shank may angle forwards at the leading edges at about 135° and 225° at the back and extend downwardly a vertical distance of approximately a further 400 mm.

The shank (31) may comprise lateral grooves for seating respective leading edges of the side plates (27) therein at the 30 degree outward angle. The plates (27) may be fastened onto the shank by matching gussets which are bolted together. The trailing sections of the plates (27) may be held in position by cleats (34) welded on the inside of each side plate (27) that are bolted on to spacing bars (35) cut to the length appropriate for the size of side plate/furrow width that is desired (FIG. 6).

An overflow plate (36) is optionally welded vertically to the top edge of the side plates (27). The overflow plate (36) may be wedge shaped and cut to match the top length of the side plates (27).

An optional hardened steel shin guard (37) may be screwed on to the leading edge of the shank (31), from the bottom to the top of the angled base of the shank (31).

Optional hardened steel wear plates (38) may be bolted on to the bottom edges of the side plates (27).

INTERPRETATION

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the both agricultural and horticultural irrigation industries and the dryland (rainfed) agricultural industry with furrowers where seasonal waterlogging occurs, or where the furrowers are replaced by defined traffic lanes and machinery is guided by GPS interfaced steering mechanisms.

The invention claimed is:

1. A bed renovator frame having at least one a soil loosening assembly, the soil loosening assembly comprising:
   a rigid shank fixed beneath the frame; and
   a blade assembly fixed to the shank, the blade assembly comprising a pair of blades extending horizontally from either side of the base of the shank, wherein:
   each blade has a leading edge angle of approximately 30° from a rear centreline of a direction-of-travel axis;
   each blade comprises a lateral rearward span at right angles to the direction-of-travel of approximately 350 mm;
   each blade defines an inner edge aligned with a direction-of-travel axis being approximately 350 mm; and
   the shank is fixed to the renovator frame to draw the blades beneath a soil surface at a fixed depth of approximately 250 mm to sever rootstock at the level of the blades while retaining the rootstock substantially in place and loosen soil above the level of the blade assembly without substantial soil disturbance or inversion.

2. A bed renovator frame as claimed in claim 1, wherein laterally extending horizontal blades are symmetric about a direction-of-travel axis.

3. A bed renovator frame as claimed in claim 1, wherein the blades have swept-wing profiles.

4. A bed renovator frame as claimed in claim 1, wherein each blade defines an outer edge aligned with a direction-of-travel axis being approximately 100 mm.

5. A bed renovator frame as claimed in claim 1, wherein each blade has a length along a direction-of-travel axis being approximately 640 mm.

6. A bed renovator frame as claimed in claim 1, wherein each blade is trapezoid defining a leading edge and an outer edge and wherein the outer edge is aligned with a direction-of-travel axis and wherein the leading edge has a length along the direction-of-travel axis of approximately 540 mm.

7. A bed renovator frame as claimed in claim 1, wherein each blade is trapezoid defining an inner edge and a trailing edge and wherein the inner edge is aligned with a direction-of-travel axis and wherein the inner edge has a length of approximately 340 mm and wherein the trailing edge behind the shank has a length along the direction of travel axis of approximately 300 mm.

8. A bed renovator frame as claimed in claim 1, wherein the blades have thickness of substantially 10 mm and a bevel on the leading edge of approximately 45° with respect to the lower side of the blade.

9. A bed renovator frame as claimed in claim 1, wherein each blade comprises a rearward inner perpendicular mounting plate configured for fastening to an opposite rearward mounting plate of an adjacently mounted blade and a forward inner perpendicular mounting plate configured for fastening to a shank.

10. A bed renovator frame as claimed in claim 1, further comprising a shank and further comprising a clamp for clamping the shank laterally along a horizontal frame member.

11. A bed renovator frame as claimed in claim 10, further comprising a shank height adjustment mechanism.

12. A bed renovator frame as claimed in claim 11, wherein the shank height adjustment mechanism comprises a pair of vertically orientated plates engaging the shank therebetween and wherein an edge of the shank comprises height adjustment notches configured for engaging bolts passing through the vertically orientated plates.

13. A bed renovator frame as claimed in claim 1, wherein the at least one soil loosening assembly comprises four soil loosening assemblies comprising two centrally mounted soil loosening assemblies and two laterally mounted soil loosening assemblies, each laterally mounted soil loosening assembly spaced further apart from an adjacent centrally mounted soil loosening assembly as compared to the spacing between the two centrally mounted soil loosening assemblies.

* * * * *